(12) United States Patent
Kim et al.

(10) Patent No.: US 8,081,061 B2
(45) Date of Patent: Dec. 20, 2011

(54) MOBILE RFID READER AND METHOD OF ELIMINATING A TRANSMISSION LEAKAGE SIGNAL

(75) Inventors: Joungho Kim, Daejeon (KR); Youngwon Kim, Daegu (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1268 days.

(21) Appl. No.: 11/741,974

(22) Filed: Apr. 30, 2007

(65) Prior Publication Data

US 2007/0285251 A1 Dec. 13, 2007

(30) Foreign Application Priority Data

May 17, 2006 (KR) .................................. 2006-44034

(51) Int. Cl.
*H04Q 5/22* (2006.01)
*G08B 13/14* (2006.01)

(52) U.S. Cl. ...................... 340/10.1; 340/10.3; 340/10.4; 340/10.5; 340/572.1; 340/572.4

(58) Field of Classification Search ........ 340/10.1–10.5, 340/572.1, 572.4; 455/280, 296, 196.1, 82, 455/76; 333/109, 100; 375/219, 222

See application file for complete search history.

(56) References Cited

U.S. PATENT DOCUMENTS

| 5,444,864 | A  | * | 8/1995  | Smith ............................. 455/84 |
| 6,229,992 | B1 | * | 5/2001  | McGeehan et al. ............. 455/78 |
| 6,915,112 | B1 | * | 7/2005  | Sutton et al. ............... 455/67.13 |
| 7,492,812 | B2 | * | 2/2009  | Ninomiya et al. ............ 375/219 |
| 7,706,755 | B2 | * | 4/2010  | Muhammad et al. .......... 455/76 |
| 2005/0207509 | A1 | * | 9/2005 | Saunders et al. ............. 375/285 |
| 2006/0252398 | A1 | * | 11/2006 | Park et al. ..................... 455/296 |
| 2007/0194886 | A1 | * | 8/2007  | Bang et al. ................... 340/10.1 |

* cited by examiner

*Primary Examiner* — Nam V Nguyen
(74) *Attorney, Agent, or Firm* — Daly, Crowley, Mofford & Durkee, LLP (57) ABSTRACT

A mobile radio-frequency identification (RFID) reader includes a high-frequency front-end unit including an antenna, a circulator, an output amplifier, and a signal processor chip. The signal processor chip includes a high-frequency transceiver, a pseudo-leakage signal generator configured to generate a pseudo-leakage signal based on a transmission high-frequency signal, the transmission high-frequency signal being provided from the high-frequency transceiver and being provided to the high-frequency front-end unit and a subtractor configured to subtract the pseudo-leakage signal from a received high-frequency signal to generate a subtracted signal, the pseudo-leakage signal corresponding to a transmission leakage signal included in the received high-frequency signal, the received high-frequency signal being provided from the high-frequency front-end unit, and the subtracted signal being provided to the high-frequency transceiver. Therefore, the RFID reader may eliminate a transmission leakage signal.

8 Claims, 6 Drawing Sheets

MOBILE RFID READER AND METHOD OF ELIMINATING A TRANSMISSION LEAKAGE SIGNAL

CROSS-REFERENCE TO RELATED APPLICATIONS

This application claims priority under 35 USC §119 to Korean Patent Application No. 2006-44034, filed on May 17, 2006, in the Korean Intellectual Property Office (KIPO), the disclosure of which is incorporated herein in its entirety by reference.

BACKGROUND OF THE INVENTION

1. Field of the Invention

The present invention relates to a mobile radio-frequency identification (RFID) and more particularly to a mobile RFID reader and a method of eliminating a transmission leakage signal in the mobile RFID reader.

2. Description of the Related Art

Generally, a radio-frequency identification (RFID) reader is either a fixed type or a mobile type, so that the RFID reader provides power to an electronic tag and reads an RFID code that is provided from the electronic tag.

Frequency bands used by the RFID reader is classified into a 125 kHz/134 kHz band, a 13.56 MHz band, a 433 MHz band, a 900 MHz band, a 2.45 GHz band, and a 5.8 GHz band.

Nowadays, a research related to RFID technology in the 900 MHz band is being actively conducted, and the 900 MHz band is similar to a band used by mobile devices such as cell phones.

Presently, a 900 MHz reader is a fixed reader based on a patch-type antenna. Companies such as Alien and AWID manufacture internal antenna-based mobile readers. Influenced by Wal-Mart, a North American-type reader is also manufactured. The frequency band used by the North American-type reader is 902-928 MHz, and the North American-type reader uses the frequency-hopping spread spectrum (FHSS) method and conforms to Federal Communications Commission (FCC) standards.

The latest reader technology tends to follow demand in the physical distribution field, beginning with retailers such as Wal-Mart. Most of the readers have a mobile reader module. There are several types of mobile reader modules, including a type that is applied to an industrial personal digital assistant (PDA), a Personal Computer Memory Card International Association (PCMCIA) (now PC Card) type, and a module type, according to a type of reader. Readers may be classified according to power source, including built-in battery-type readers and removable battery-type readers. There is a difference in power consumption according to whether a 0.5 W module or a 1 W module is used. The latest technology allows a reader to have a continuous operation time of 1 to 2 hours. There is no reader that is yet able to satisfy user demands in terms of operation time and performance. A system-on-chip (SOC) of the RFID reader is in demand so that the RFID reader can be built into a cell phone, because recent cell phones tend to be small, lightweight and slim.

The RFID reader usually uses just one antenna, and a transmitter unit and a receiver unit are divided by a circulator because the RFID reader transmits and receives signals within the same frequency band of 910-940 MHz.

If a transmission power is 25 dBm (250 mW), and a circulator isolation is 25 dB, which is currently the maximum isolation for circulators, and the transmission power is leaked to a receiver unit, 0 dBm of power is inputted to a receiver unit. To solve the problem that is described above, the RFID reader may have a separate passive device (isolator or coupler) whose isolation is greater than 40 dB. However, the separate passive device has to be longer than 20 cm in size in order to satisfy the high isolation. Therefore, it is impossible to apply the separate passive device to an RFID reader that is built into a cell phone.

SUMMARY OF THE INVENTION

Accordingly, the present invention is provided to substantially obviate one or more problems due to limitations and disadvantages of the related art.

Example embodiments of the present invention provide a mobile radio-frequency identification (RFID) reader capable of eliminating a transmission leakage signal.

Example embodiments of the present invention also provide a method of eliminating a transmission leakage signal in a mobile RFID reader.

In some embodiments of the present invention, a mobile radio-frequency identification (RFID) reader includes a high-frequency front-end unit including an antenna, a circulator, an output amplifier, and a signal processor chip. The signal processor chip includes a high-frequency transceiver, a pseudo-leakage signal generator configured to generate a pseudo-leakage signal based on a transmission high-frequency signal, the transmission high-frequency signal being provided from the high-frequency transceiver and being provided to the high-frequency front-end unit and a subtractor configured to subtract the pseudo-leakage signal from a received high-frequency signal to generate a subtracted signal, the pseudo-leakage signal corresponding to a transmission leakage signal included in the received high-frequency signal, the received high-frequency signal being provided from the high-frequency front-end unit, and the subtracted signal being provided to the high-frequency transceiver.

The pseudo-leakage signal generator may include a first metal-oxide semiconductor (MOS) transistor that receives a positive signal of the transmission high-frequency signal, a second MOS transistor that receives a negative signal of the transmission high-frequency signal, a first low-pass filter (LPF) coupled between a ground voltage and sources of the first MOS transistor and the second MOS transistor, a third MOS transistor coupled between a drain of the first MOS transistor and a negative output node, the third MOS transistor having a gate to which a power supply voltage is applied, a fourth MOS transistor coupled between a drain of the second MOS transistor and a positive output node, the fourth MOS transistor having a gate to which the power supply voltage is applied, and a second LPF coupled between the power supply voltage and drains of the third MOS transistor and the fourth MOS transistor, and the pseudo-leakage signal generator differentially amplifies the transmission high-frequency signal to generate the pseudo-leakage signal.

The subtractor may include an input circuit unit coupled between a first input terminal to which the received high-frequency signal is applied and a second input terminal to which the pseudo-leakage signal is applied, the input circuit unit being configured to generate a first current signal and a second current signal, such that magnitudes of the first current signal and the second current signal complementarily vary in response to a difference signal between the received high-frequency signal and the pseudo-leakage signal that are respectively inputted to the first and second input terminals, an output circuit unit configured to generate an output voltage in response to a difference between the first current signal and the second current signal, and a bias circuit unit configured to provide a bias current to the input circuit unit.

The input circuit unit may include a first bias current source coupled between a first power supply voltage and a first node, and configured to provide a first bias current to the first node, a second bias current source coupled between a second power supply voltage and a second node, and configured to provide a second bias current to the second node, a first transistor diode-coupled between the first node and the first input terminal, a second transistor diode-coupled between the second node and the first input terminal, a third transistor coupled between the second input terminal and a third node, and having a gate coupled to a gate of the first transistor, and a fourth transistor coupled between the second input terminal and a fourth node, and having a gate coupled to a gate of the second transistor.

Each of the first transistor and the third transistor may correspond to an NMOS transistor, and each of the second transistor and the fourth transistor may correspond to a PMOS transistor.

The output circuit unit may include a first PMOS current mirror that mirrors the first current signal, a first NMOS current mirror that mirrors the second current signal, a second NMOS current mirror that mirrors an output current of the first PMOS current mirror to provide a first mirrored output current to an output terminal, and a second PMOS current mirror that mirrors an output current of the first NMOS current mirror to provide a second mirrored output current to the output terminal.

For example, a frequency band of the transmission high-frequency signal and the received high-frequency signal may correspond to an about 900 MHz band.

The mobile RFID reader may further include a delay unit configured to delay the pseudo-leakage signal, the delay unit being coupled between the pseudo-leakage signal generator and the subtractor.

In other embodiments of the present invention, a method of eliminating a transmission leakage signal in a mobile radio-frequency identification (RFID) reader, the method includes simultaneously outputting an amplified transmission high-frequency signal to an antenna through a first path of a circulator and receiving a received high-frequency signal from the antenna through a second path of the circulator, subtracting a pseudo-leakage signal from the received high-frequency signal to generate a subtracted signal, the pseudo-leakage signal corresponding to a transmission leakage signal that is leaked through the second path of the circulator, and amplifying the subtracted signal.

The pseudo-leakage signal may be generated by measuring a leakage signal and by amplifying the transmission high-frequency signal to substantially the same level of the leakage signal.

In still other embodiments of the present invention, a mobile RFID reader includes a high-frequency front-end unit including an antenna, a circulator, an output amplifier, and a signal processor chip, and the signal processor chip may include a high-frequency transceiver, a pseudo-leakage signal generator configured to generate a pseudo-leakage signal based on a local oscillator signal provided from the high-frequency transceiver, the local oscillator signal being provided to the high-frequency front-end unit and a subtractor configured to subtract the pseudo-leakage signal from received high-frequency signal to generate a subtracted signal to the high-frequency transceiver, the pseudo-leakage signal corresponding to a transmission leakage signal included in the received high-frequency signal, the received high-frequency signal being provided from the high-frequency front-end unit and amplified with low noise.

In still other embodiments of the present invention, a mobile RFID reader includes a high-frequency front-end unit including an antenna, a circulator, an output amplifier, and a signal processor chip, and the signal processor chip may include a high-frequency transceiver, a pseudo-leakage signal generator configured to generate a pseudo-leakage signal based on a local oscillator signal provided from the high-frequency transceiver, the local oscillator signal being provided to the high-frequency front-end unit and a mixer configured to input and differentially mix the pseudo-leakage signal and a received high-frequency signal to generate a subtracted signal, the pseudo-leakage signal corresponding to a transmission leakage signal included in the received high-frequency signal, the received high-frequency signal being provided from the high-frequency front-end unit and amplified with low noise.

Therefore, the present invention may eliminate an output leakage signal so that the RFID reader may be miniaturized, and the weight of the RFID reader may be decreased.

DESCRIPTION OF THE EMBODIMENTS

Embodiments of the present invention now will be described more fully with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
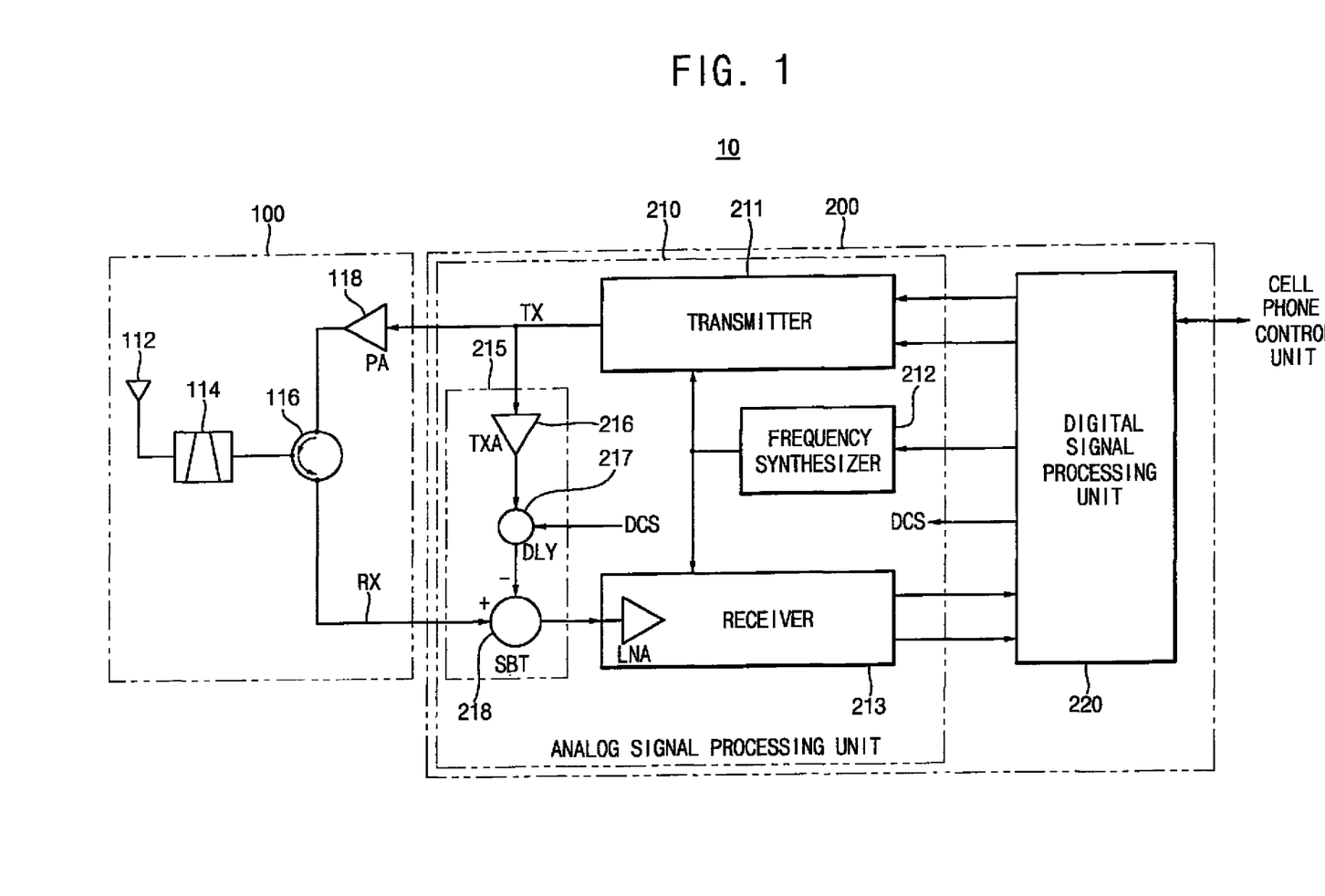
FIG. 1 is a block diagram illustrating a configuration of a mobile radio-frequency identification (RFID) reader according to an example embodiment of the present invention.

FIG. 1 is a block diagram illustrating a configuration of a mobile radio-frequency identification (RFID) reader according to an example embodiment of the present invention.

Referring to FIG. 1, the RFID reader 10 includes a high-frequency front-end unit 100 and a signal processor chip 200.

The high-frequency front-end unit 100 includes an antenna 112, a band-pass filter (BPF) 114, a circulator 116, and a power amplifier 118.

An output terminal of the power amplifier 118 is coupled to a first port of the circulator 116, and a second port of the circulator 116 is coupled to the antenna 112 through the BPF 114. A received high-frequency signal received through the antenna 112 is applied to a second port of the circulator 116, and is provided to the signal processor chip 200 coupled to a third port of the circulator 116.

An output path (i.e., a path coupled between the first port and the second port) of the circulator 116 is isolated by about 25 dB from an input path (i.e., a path coupled between the second port and the third port) of the circulator 116. Therefore, an amplified signal, by the power amplifier 118, having an about 25 dBm may be leaked through the output path and the input path and the leaked signal has an about 0 dBm.

The signal processor chip 200 includes an analog signal processing unit (ASPU) 210 and a digital signal processing unit (DSPU) 220, and may be implemented on a single chip.

The ASPU 210 includes a transmitter 211, a frequency synthesizer 212, a receiver 213, and a leakage signal eliminator 215.

The transmitter 211 mixes digital command data with a carrier frequency of about 915 MHz to generate a high-frequency signal and provides the high-frequency signal as a transmission high-frequency signal TX.

The receiver 213 amplifies a received signal RX with low noise, demodulates the amplified signal, and provides the demodulated signal to the DSPU 220. The demodulated signal may correspond to a baseband signal.

The frequency synthesizer 212 performs a phase locking on a clock signal provided from the DSPU 220 and provides the phased locked signal to the transmitter 211 and the receiver 213.

The leakage signal eliminator 215 includes a pseudo-leakage signal generator 216, a delay unit 217, and a subtractor 218. The leakage signal eliminator 215 receives the transmission high-frequency signal TX to generate a pseudo-leakage signal, synthesizes the generated pseudo-leakage signal and the received high-frequency signal RX to eliminate a transmission leakage signal, and provides the eliminated signal to the receiver 213. The transmission leakage signal may include a high-frequency component that is leaked to the receiver 213 on a chip.

The DSPU 220 includes a digital signal processor, an encoder, a decoder, a nonvolatile memory, and an interface unit. The DSPU 220 is coupled to a control unit of a cellular phone and receives a command to provide an RFID code that is read from a tag.

The DSPU 200 controls a delay time of the delay unit 217 by generating a delay control signal DCS. A delay time of the transmission leakage signal in the received high-frequency signal RX from the circulator 116 is substantially equal to a delay time of the pseudo-leakage signal from the pseudo-leakage signal generator 216.

Figure 2:
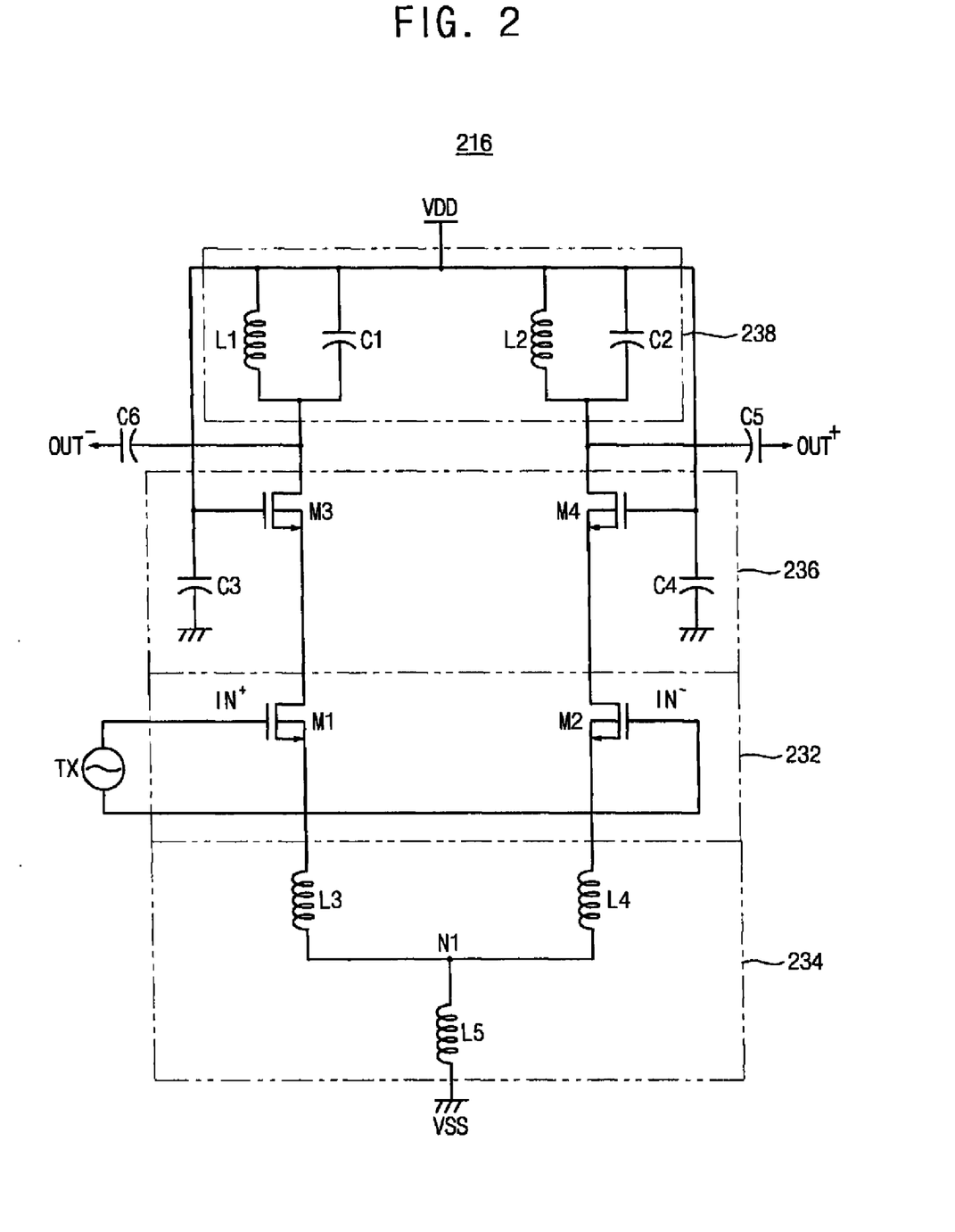
FIG. 2 is a circuit diagram illustrating the pseudo-leakage signal generator of FIG. 1.

FIG. 2 is a circuit diagram illustrating the pseudo-leakage signal generator of FIG. 1.

Referring to FIG. 2, the pseudo-leakage signal generator 216 may be configured with a metal-oxide semiconductor (MOS) circuit having a differential amplifier type. A differential amplifier may be implemented so that a gain of the differential amplifier corresponds to an amount of a transmission leakage signal that leaks through a circulator.

The pseudo-leakage signal generator 216 includes a differential input unit 232, a first low-pass filter (LPF) 234, a second LPF 238, and an output load unit 236.

The differential input unit 232 includes n-channel MOS (NMOS) transistors M1 and M2 differentially receiving the transmission high-frequency signal TX and the transmission high-frequency signal TX is provided to the power amplifier 118. The transmission high-frequency signal TX is applied to a gate of the NMOS transistor M1 and a gate of the NMOS transistor M2. Sources of the NMOS transistors M1 and M2 are respectively coupled to the first LPF 234, and drains of the NMOS transistors M1 and M2 are respectively coupled to the output load unit 236.

The first LPF 234 includes inductors L3 and L4. The inductor L3 is coupled between a source of the NMOS transistor M1 and a common node N1, and the inductor L4 is coupled between a source of the NMOS transistor M2 and the common node N1. An inductor L5 is coupled between the common node N1 and a ground voltage VSS. The first LPF 234 prevents a flow of the transmission high-frequency signal TX to the ground voltage VSS, and provides a DC bias current to the differential input unit 232.

The output load unit 236 includes NMOS transistors M3 and M4, and capacitors C3 and C4. A source of the NMOS transistor M3 is coupled to a drain of the NMOS transistor M1, and a gate of the NMOS transistor M3 is coupled to the capacitor C3 and a power voltage VDD. A source of the NMOS transistor M4 is coupled to a drain of the NMOS transistor M2, and a gate of the NMOS transistor M4 is coupled to the capacitor C4 and the power voltage VDD. Drains of the NMOS transistors M3 and M4 are respectively coupled to the second LPF 238.

The second LPF 238 includes inductors L1 and L2 and capacitors C1 and C2. The inductor L1 and the capacitor C1 are coupled in parallel between the power voltage VDD and the drain of the NMOS transistor M3. The inductor L2 and the capacitor C2 are coupled in parallel between the power voltage VDD and the drain of the NMOS transistor M4. The second LPF 238 applies a DC power voltage to the NMOS transistors M3 and M4, and the second LPF 238 prevents a flow of the transmission high-frequency signal TX to a power voltage line to reduce a generation of power noise.

The NMOS transistors M3 and M4 are operated in a saturated state due to the capacitors C3 and C4 to maintain a fixed turn-on resistor value. The capacitors C3 and C4 are respectively coupled to the gates of the NMOS transistors M3 and M4. The drain of the NMOS transistor M4 is coupled to an output terminal through a capacitor C5. The drain of the NMOS transistor M3 is coupled to an output terminal through a capacitor C6. Therefore, a pseudo-leakage signal corresponding to AC is provided to the output terminal because the capacitors C5 and C6 prevent DC.

Figure 3:
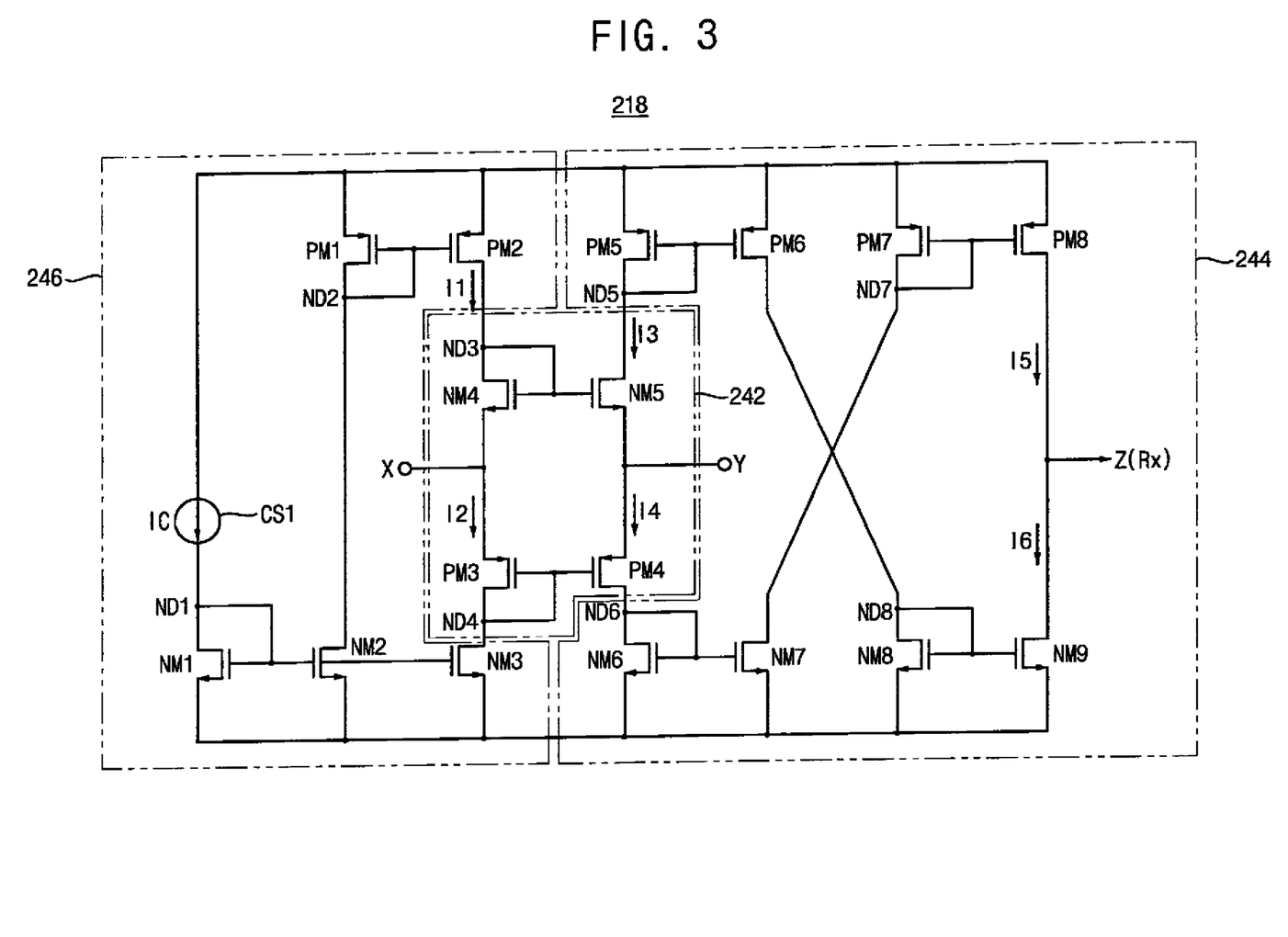
FIG. 3 is a circuit diagram illustrating the subtractor of FIG. 1.

FIG. 3 is a circuit diagram illustrating the subtractor of FIG. 1.

Referring to FIG. 3, the subtractor 218 includes an input circuit unit 242, an output circuit unit 244, and a bias circuit unit 246.

The input circuit unit 242 is coupled between a first input terminal to which a received high-frequency signal RX is applied and a second input terminal to which a pseudo-leakage signal is applied. The input circuit unit 242 generates a first current signal and a second current signal such that magnitudes of the first and second current signals complementarily vary in response to a difference signal between the received high-frequency signal RX and the pseudo-leakage signal respectively provided to the first and second input terminals.

The input circuit unit 242 includes PMOS transistors PM3 and PM4 and NMOS transistors NM4 and NM5. A source of the NMOS transistor NM4 is coupled to an input terminal X, and a drain and a gate of the NMOS transistor NM4 are diode-coupled to a node ND3. A source of the NMOS transistor NM5 is coupled to an input terminal Y, a gate of the NMOS transistor NM5 is coupled to the node ND3, and a drain of the NMOS transistor NM5 is coupled to a node ND5. Therefore, the NMOS transistors NM4 and NM5 are coupled to each other in a current mirror type.

A source of the PMOS transistor PM3 is coupled to the input terminal X, and a drain and a gate of the PMOS transistor PM3 are diode-coupled to a node ND4. A source of the PMOS transistor PM4 is coupled to the input terminal Y, a gate of the PMOS transistor PM4 is coupled to a node ND4, and a drain of the PMOS transistor PM4 is coupled to a node ND6. Therefore, the PMOS transistors PM3 and PM4 are coupled to each other in a current mirror type. A bias current signal I1 is applied to the node ND3, and a bias current signal I2 is applied to the node ND4.

The output circuit unit 244 includes PMOS transistors PM5 and PM6 forming a first current mirror, NMOS transistors NM6 and NM7 forming a second current mirror, NMOS transistors NM8 and NM9 forming a third current mirror, and PMOS transistors PM7 and PM8 forming a fourth current mirror.

The first current mirror mirrors a first current signal I3. The second current mirror mirrors a second current signal I4. The third current mirror mirrors an output current signal of the first current mirror to provide an output current signal I6 to an output terminal Z. The fourth current mirror mirrors an output current signal of the second current mirror to provide an output current signal I5 to the output terminal Z.

Therefore, an output voltage level of the output terminal Z may vary in response to a difference current between the output current signal I5 and the output current signal I6.

A bias circuit unit 246 includes a reference current source CS1 that provides a reference current Ic to a node ND1, NMOS transistors NM1, NM2 and NM3 that forms a current mirror and generates a bias current signal I2 by mirroring the reference current Ic, and PMOS transistors PM1 and PM2 that forms a current mirror and generates a bias current signal I1 by mirroring the reference current Ic.

The transistor NM3 is a second bias current source of the input circuit unit 242. A current mirrored by the NMOS transistor NM2 is provided to a node ND2, and the current mirror configured with the PMOS transistors PM1 and PM2 generates a bias current signal I1 by mirroring a current that is applied to the node ND2. The PMOS transistor PM2 is a first bias current source of the input circuit unit 242.

Therefore, when the levels of the two signals that are applied to the input terminals X and Y of the subtractor 218 are substantially the same and are substantially equal to ½ VDD, I1=I2=I3=I4.

When a level of a signal applied to the input terminal X is higher than that applied to the input terminal Y, a voltage difference between a gate and a source of the NMOS transistor NM4 is decreased, but a voltage difference between a gate and a source of the NM5 relatively increases. Thus, the level of the first current signal I3 is higher than that of the bias current signal I1. At the same time, a voltage difference between a gate and a source of the PMOS transistor PM4 decreases, but a voltage difference between a gate and a source of the PMOS transistor PM3 relatively increases. Thus, the level of the bias current signal I2 is higher than that of the second current signal I4. Therefore, the level of the output current signal I5 applied to the output terminal decreases in proportion with that of the second current signal I4, and the level of the output current signal I6 applied to the output terminal increases in proportion with that of the first current signal I3.

When a level of the signal applied to the input terminal X is lower than that of the signal applied to the input terminal Y, the voltage difference between the gate and the source of the NMOS transistor NM4 is increased, but the voltage difference between the gate and the source of the NMOS transistor NM5 is relatively decreased. Thus, the level of the first current signal I3 is lower than that of the bias current signal I1. At the same time, because the voltage difference between the gate and the source of the PMOS transistor PM4 is increased but the voltage difference between the gate and the source of the PMOS transistor PM3 is relatively decreased, Thus the level of the bias current signal I2 is lower than that of the second current signal I4. Therefore, the output current signal I5 applied to the output terminal is increased in proportion with that of the second current signal I4, and the output current signal I6 applied to the output terminal is decreased in proportion with that of the first current signal I3.

That is, a difference signal between the signal applied to the input terminal X and the signal applied to the input terminal Y is provided to the output terminal Z.

The present invention may use the leakage signal eliminator 215 in front of the high-frequency receiver 213 to eliminate the transmission leakage signal. That is, the present invention may be implemented as a single chip without any additional parts. Also, the subtractor 218 is designed with a complementary MOS (CMOS) circuit to minimize power consumption of the RFID reader because the RFID reader is built into a mobile device.

Figure 4:
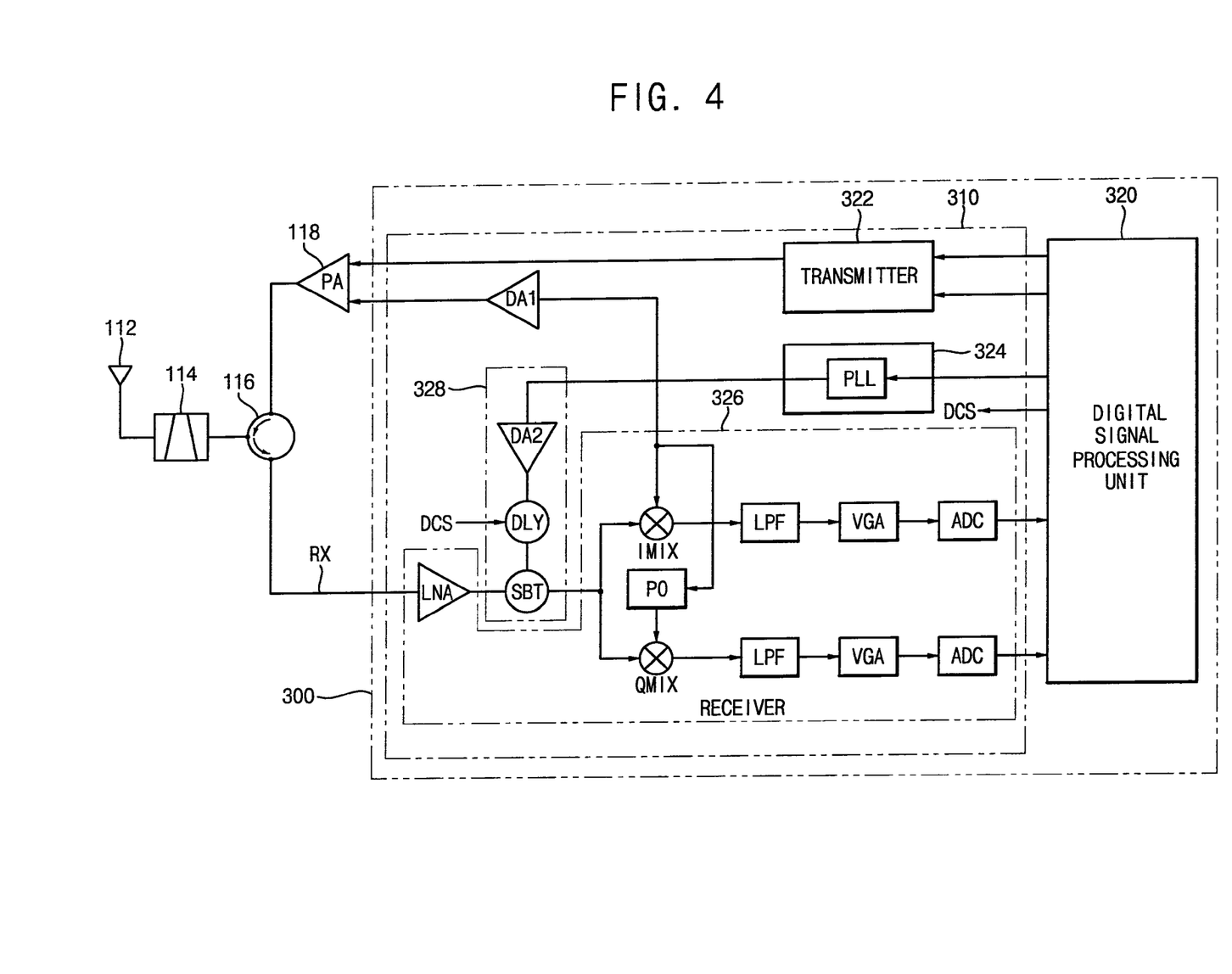
FIG. 4 is a block diagram illustrating a mobile RFID reader according to another example embodiment of the present invention.

FIG. 4 is a block diagram illustrating a mobile RFID reader according to another example embodiment of the present invention.

The RFID reader in FIG. 4 differs from that in FIG. 1 with respect to a fact that the RFID reader in FIG. 4 uses an output signal of a phase-locked loop (PLL) of a frequency synthesizer instead of the transmission high-frequency signal TX of FIG. 1 and a subtractor 218 uses an output signal of a low-noise amplifier (LNA).

A signal processing chip 300 includes an analog signal processing unit (ASPU) 310 and a digital signal processing unit (DSPU) 320 in a single chip.

The ASPU 310 includes a transmitter 322, a frequency synthesizer 324, a receiver 326 and a leakage signal eliminator 328.

Generally, when the RFID reader receives a signal from an RFID tag, the transmitter 322 continuously transmits only a clock signal generated from the PLL of the frequency synthesizer 324.

The leakage signal eliminator 328 uses an output signal of the PLL as an input signal of a leakage signal generator DA2. The leakage signal generator DA2 amplifies the output signal of the PLL and provides the amplified signal to a delay unit DLY.

The delay unit DLY delays the amplified signal and provides the delayed signal to the subtractor SBT.

The subtractor SBT subtracts a pseudo-leakage signal from the received high-frequency signal RX to generate a subtracted signal that eliminated a transmission leakage signal in the received high-frequency signal RX and provides the subtracted signal to mixers IMIX and QMIX. A pseudo-leakage signal is provided from the delay unit. The received high-frequency signal RX is amplified by the LNA.

Figure 5:
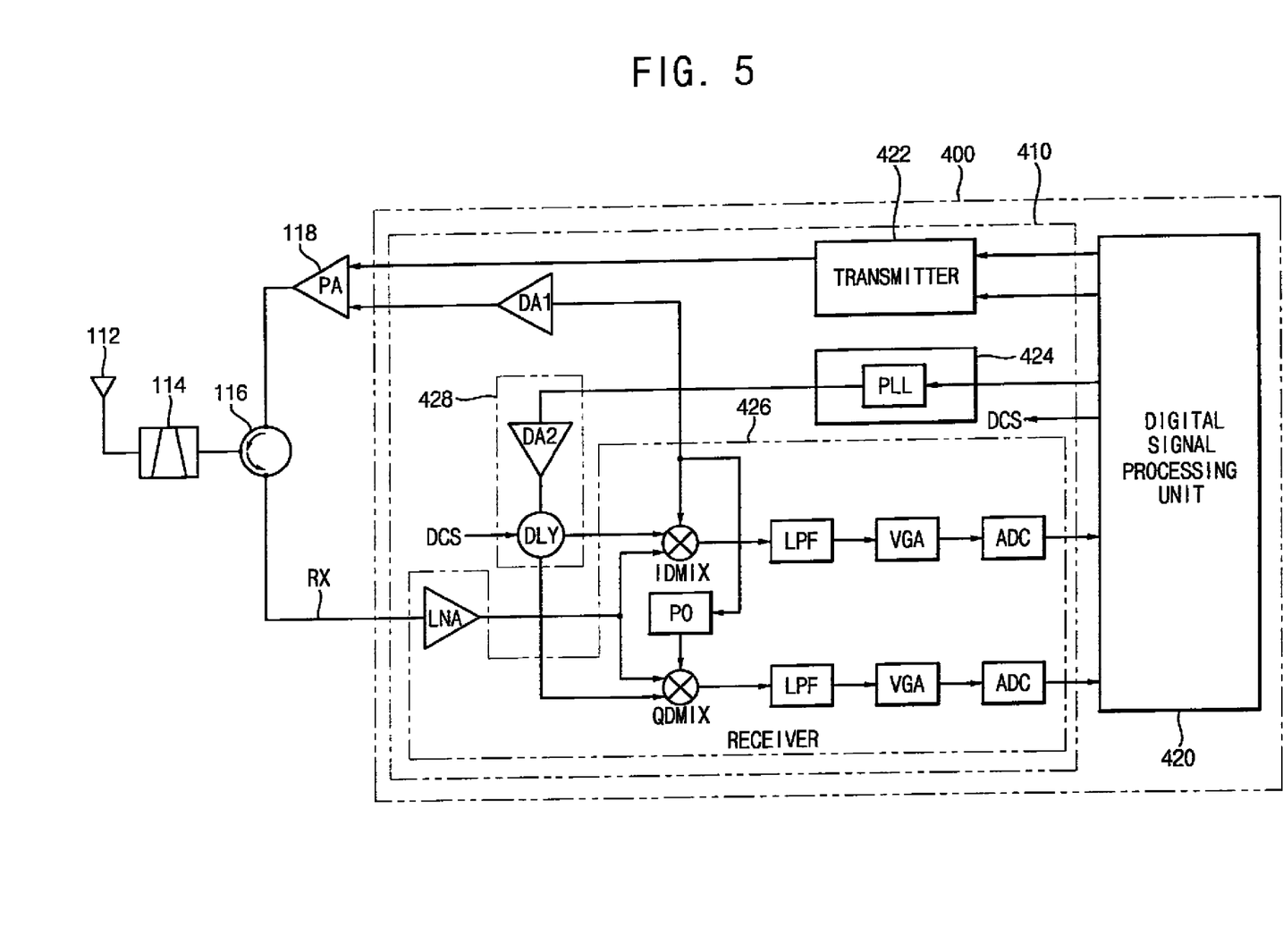
FIG. 5 is a block diagram illustrating a mobile RFID reader according to still another example embodiment of the present invention.

FIG. 5 is a block diagram illustrating a mobile RFID reader according to still another example embodiment of the present invention.

The mobile RFID reader in FIG. 5 differs from that in FIG. 4 with respect to a fact that the mobile RFID reader in FIG. 5 does not include a subtractor.

A signal processor chip 400 includes an analog signal processing unit (ASPU) 410 and a digital signal processing unit (DSPU) 420 in a single chip.

The ASPU 410 includes a transmitter 422, a frequency synthesizer 424, a receiver 426 and a leakage signal eliminator 428.

The leakage signal eliminator 428 uses an output signal of the PLL as an input signal of a leakage signal generator DA2. The leakage signal generator DA2 amplifies the output signal of the PLL and provides the amplified signal to a delay unit DLY.

The delay unit DLY delays the amplified signal by a predetermined time and provides the delayed signal to each of first input terminals of differential mixers IDMIX and QDMIX.

An amplified signal by a low-noise amplifier (LNA) is provided to each of second input terminals of differential mixers IDMIX and QDMIX. In the differential mixers IDMIX and QDMIX, a pseudo-leakage signal and a transmission leakage signal in a received high-frequency signal RX are automatically eliminated due to a common-mode rejection principle. Therefore, when the RFID reader uses the differential mixers IDMIX and QDMIX, a circuit configuration of the RFID reader is simpler due to an elimination of the subtractor SBT in FIG. 4.

Figure 6:
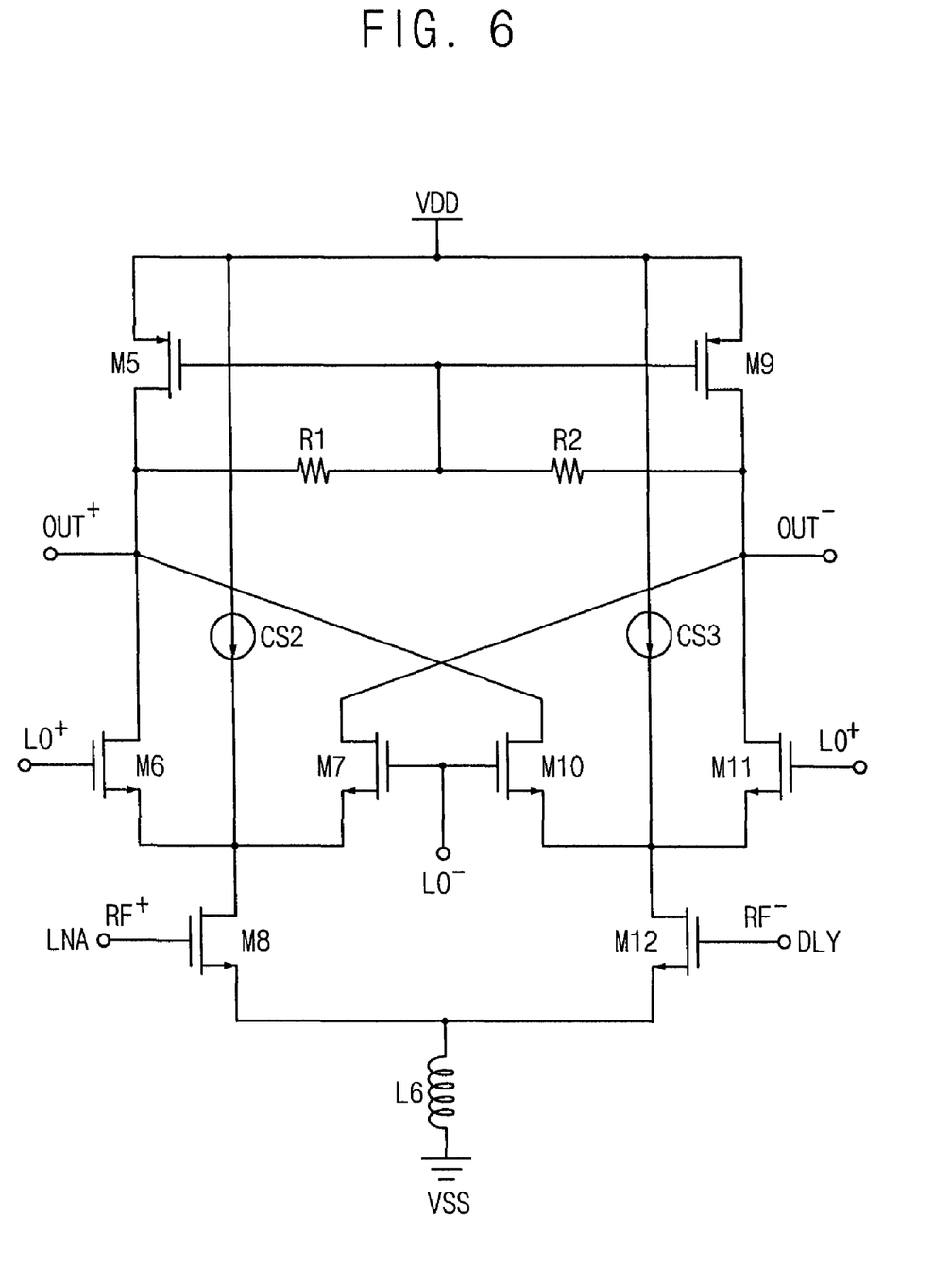
FIG. 6 is a circuit diagram illustrating each of differential mixers IDMIX and QDMIX in FIG. 5.

FIG. 6 is a circuit diagram illustrating each of differential mixers IDMIX and QDMIX in FIG. 5.

Each of the differential mixers IDMIX and QDMIX includes transistors M5 through M12, an inductor L6, resistors R1 and R2, and current sources CS2 and CS3. Each of the differential mixers IDMIX and QDMIX is configured with a double-balanced mixer type.

The received high-frequency signal RX is amplified by the LNA. The amplified signal is applied to a gate of the MOS transistor M8. A pseudo-leakage signal provided from a delay unit DLY is applied to a gate of the MOS transistor M12. Sources of the MOS transistors M8 and M12 are respectively coupled to a ground voltage VSS through the inductor L6. A drain of the MOS transistor M8 is coupled to sources of the MOS transistors M6 and M7. The MOS transistors M6 and M7 are common-source MOS transistors. A local oscillator signal LO+ provided from the PLL is applied to a gate of the MOS transistor M6, and a local oscillator signal LO− provided from the PLL is applied to a gate of the MOS transistor M7. A drain of the MOS transistor M6 is coupled to a positive output terminal OUT+, and a drain of the MOS transistor M7 is coupled to a negative output terminal OUT−.

A drain of the MOS transistor M12 is coupled to sources of the MOS transistors M10 and M11. The MOS transistors M10 and M11 are common-source MOS transistors. A local oscillator signal LO+ provided from the PLL is applied to a gate of the MOS transistor M11, and a local oscillator signal LO− provided from the PLL is applied to a gate of the MOS transistor M10. A drain of the MOS transistor M10 is coupled to a positive output terminal OUT+, and a drain of the MOS transistor M1 is coupled to a negative output terminal OUT−.

Therefore, common components of the received high-frequency signal RX and the pseudo-leakage signal applied to the differential mixers IDMIX and QDMIX are eliminated, and a signal without a leakage component in the received high-frequency signal RX is provided to an output terminal.

As described above, the present invention may eliminate a transmission leakage signal so that the RFID reader is miniaturized, and the weight of the RFID reader is decreased. That is, the number of parts of the RFID reader may be reduced and the RFID reader is built into a mobile device such as a cell phone.

Having thus described example embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A mobile radio-frequency identification (RFID) reader, comprising:
    a high-frequency front-end unit including an antenna, a circulator, and an output amplifier; and
    a signal processor chip, comprising:
        a high-frequency transceiver;
        a pseudo-leakage signal generator configured to generate a pseudo-leakage signal based on a transmission high-frequency signal, the pseudo-leakage signal corresponding to a transmission leakage signal included in a received high-frequency signal, the transmission high-frequency signal being provided from the high-frequency transceiver and being provided to the high-frequency front-end unit; and
        a subtractor configured to subtract the pseudo-leakage signal from the received high-frequency signal to generate a subtracted signal, the received high-frequency signal being provided from the high-frequency front-end unit, and the subtracted signal being provided to the high-frequency transceiver,
    wherein the subtractor comprises:
        an input circuit unit coupled between a first input terminal to which the received high-frequency signal is applied and a second input terminal to which the pseudo-leakage signal is applied, the input circuit unit being configured to generate a first current signal and a second current signal, such that magnitudes of the first current signal and the second current signal complementarily vary in response to a difference signal between the received high-frequency signal and the pseudo-leakage signal that are inputted to the first and second input terminals, respectively;

an output circuit unit configured to generate an output voltage in response to a difference between the first current signal and the second current signal; and a bias circuit unit configured to provide a bias current to the input circuit unit.

2. The mobile RFID reader of claim 1, wherein the pseudo-leakage signal generator comprises:

a first metal-oxide semiconductor (MOS) transistor that receives a positive signal of the transmission high-frequency signal;

a second MOS transistor that receives a negative signal of the transmission high-frequency signal;

a first low-pass filter (LPF) coupled between a ground voltage and sources of the first MOS transistor and the second MOS transistor;

a third MOS transistor coupled between a drain of the first MOS transistor and a negative output node, the third MOS transistor having a gate to which a power supply voltage is applied;

a fourth MOS transistor coupled between a drain of the second MOS transistor and a positive output node, the fourth MOS transistor having a gate to which the power supply voltage is applied; and a second LPF coupled between the power supply voltage and drains of the third MOS transistor and the fourth MOS transistor; and wherein the pseudo-leakage signal generator differentially amplifies the transmission high-frequency signal to generate the pseudo-leakage signal.

3. The mobile RFID reader of claim 1 wherein the input circuit unit comprises:

a first bias current source coupled between a first power supply voltage and a first node, and configured to provide a first bias current to the first node;

a second bias current source coupled between a second power supply voltage and a second node, and configured to provide a second bias current to the second node;

a first transistor diode-coupled between the first node and the first input terminal;

a second transistor diode-coupled between the second node and the first input terminal;

a third transistor coupled between the second input terminal and a third node, and having a gate coupled to a gate of the first transistor; and a fourth transistor coupled between the second input terminal and a fourth node, and having a gate coupled to a gate of the second transistor.

4. The mobile RFID reader of claim 3, wherein each of the first transistor and the third transistor corresponds to an NMOS transistor, and each of the second transistor and the fourth transistor corresponds to a PMOS transistor.

5. The mobile RFID reader of claim 1, wherein the output circuit unit comprises:

a first PMOS current mirror that mirrors the first current signal;

a first NMOS current mirror that mirrors the second current signal;

a second NMOS current mirror that mirrors an output current of the first PMOS current mirror to provide a first mirrored output current to an output terminal; and a second PMOS current mirror that mirrors an output current of the first NMOS current mirror to provide a second mirrored output current to the output terminal.

6. The mobile RFID reader of claim 1, wherein a frequency band of the transmission high-frequency signal and the received high-frequency signal corresponds to an about 900 MHz band.

7. The mobile RFID reader of claim 1, further comprising: a delay unit configured to delay the pseudo-leakage signal, the delay unit being coupled between the pseudo-leakage signal generator and the subtractor.

8. A mobile RFID reader, comprising:

a high-frequency front-end unit including an antenna, a circulator, and an output amplifier; and a signal processor chip, comprising:

a high-frequency transceiver;

a pseudo-leakage signal generator configured to generate a pseudo-leakage signal based on a local oscillator signal provided from the high-frequency transceiver, the local oscillator signal being provided to the high-frequency front-end unit; and a subtractor configured to subtract the pseudo-leakage signal from received high-frequency signal to generate a subtracted signal to the high-frequency transceiver, the pseudo-leakage signal corresponding to a transmission leakage signal included in the received high-frequency signal, the received high-frequency signal being provided from the high-frequency front-end unit and amplified with low noise, wherein the subtractor comprises:

an input circuit unit coupled between a first input terminal to which the received high-frequency signal is applied and a second input terminal to which the pseudo-leakage signal is applied, the input circuit unit being configured to generate a first current signal and a second current signal, such that magnitudes of the first current signal and the second current signal complementarily vary in response to a difference signal between the received high-frequency signal and the pseudo-leakage signal that are inputted to the first and second input terminals, respectively;

an output circuit unit configured to generate an output voltage in response to a difference between the first current signal and the second current signal; and a bias circuit unit configured to provide a bias current to the input circuit unit.

* * * * *